US008213897B2

(12) United States Patent
Hofmann

(10) Patent No.: US 8,213,897 B2
(45) Date of Patent: Jul. 3, 2012

(54) SYSTEM AND METHOD FOR TRANSMITTING A WARNING MESSAGE VIA A RADIO NETWORK

(75) Inventor: Carsten Hofmann, Berlin (DE)

(73) Assignee: **E*Message Wireless Information Services Deutschland GmbH**, Berlin (DE)

( * ) Notice: Subject to any disclaimer, the term of this patent is extended or adjusted under 35 U.S.C. 154(b) by 233 days.

(21) Appl. No.: 12/663,812

(22) PCT Filed: Jun. 4, 2008

(86) PCT No.: PCT/EP2008/056935
§ 371 (c)(1), (2), (4) Date: Dec. 9, 2009

(87) PCT Pub. No.: WO2008/151975
PCT Pub. Date: Dec. 18, 2008

(65) Prior Publication Data
US 2010/0173604 A1 Jul. 8, 2010

(30) Foreign Application Priority Data
Jun. 9, 2007 (EP) .................................... 07011345

(51) Int. Cl.
*H04M 11/04* (2006.01)

(52) U.S. Cl. ..................... 455/404.1; 455/3.01; 455/521

(58) Field of Classification Search ........... 455/414.1–3, 455/404.1, 404.2, 521
See application file for complete search history.

(56) References Cited

U.S. PATENT DOCUMENTS 5,121,430 A 6/1992 Ganzer et al.
6,816,878 B1 11/2004 Zimmers et al.
7,565,153 B2 * 7/2009 Alcock et al. .............. 455/456.1
7,605,720 B1 * 10/2009 Menzies et al. .......... 340/995.13
7,720,431 B2 * 5/2010 Lee .............................. 455/3.01
7,734,246 B2 * 6/2010 Kummer et al. ............. 455/3.01
7,784,072 B2 * 8/2010 Gurley et al. ................... 725/33
7,802,173 B2 * 9/2010 Chan et al. .................... 714/819

FOREIGN PATENT DOCUMENTS

DE 3211881 A1 12/1982

(Continued)

OTHER PUBLICATIONS

International Search Report for PCT/EP2008/056935, dated Sep. 10, 2008, three (3) pages.

*Primary Examiner* — Kamran Afshar
*Assistant Examiner* — Sayed T Zewari
(74) *Attorney, Agent, or Firm* — Rothwell, Figg, Ernst & Manbeck, P.C.

(57) ABSTRACT

A system for transmitting a warning message via a radio network has a transmitter (1) and at least one receiver (2). The transmitter (1) has an antenna for transmitting the warning message (14) over the radio network. The warning message (14) transmitted by the transmitter (1) includes parameters (18) of a warning area, a warning reason (15) and warning behavior (16). The receiver has an antenna (3) for receiving the warning message (14) transmitted via the radio network, a decoder (4), a processor (5), a memory (6) in which the location of the receiver (2) by geographic coordinates is stored and a warning output unit (7). In the processor (5) the received warning message (14) is captured and read out by means of a capture algorithm. The warning area is determined from the parameters (18) of the warning message (14) by using a zone algorithm. An analysis logarithm verifies whether the location stored in the receiver (2) is within the warning area, and if this is the case, a warning signal is generated and outputted by the warning output unit (7). The invention also comprises a receiver (2) for receiving a warning message (14) as well as a method for reception in a receiver (2) and a method for transmitting a warning message (14) in a radio network having a transmitter (1) and a receiver (2).

21 Claims, 4 Drawing Sheets

FOREIGN PATENT DOCUMENTS

| | | | |
|---|---|---|---|
| DE | 3915099 | A1 | 11/1990 |
| DE | 29914155 | U1 | 1/2000 |
| DE | 10204300 | A1 | 8/2003 |
| DE | 202004006441 | U1 | 11/2004 |
| EP | 1143394 | A2 | 10/2001 |
| WO | 2004004305 | A2 | 1/2004 |
| WO | 2004044858 | A1 | 5/2004 |

* cited by examiner

SYSTEM AND METHOD FOR TRANSMITTING A WARNING MESSAGE VIA A RADIO NETWORK

CROSS REFERENCE TO RELATED APPLICATION

This application is a 35 U.S.C. §371 National Phase Entry Application from PCT/EP/2008/056935, filed Jun. 4, 2008, and designating the United States. This application also claims priority to European Patent Application No. 07011345.1, filed Jun. 9, 2007, the disclosure of which is incorporated herein in its entirety by reference.

The present invention relates to a system for transmitting a warning message via a radio network, having one or more transmitters and one or more receivers, a receiver for receiving a warning message transmitted via a radio network, a method for receiving a warning message in a receiver of a radio network and a method for transmitting a warning message in a radio network.

Systems for transmitting a warning message have been known in the prior art for many years. These systems have gained in importance since the region-wide network of sirens for warning the population of dangerous situations has been mostly dismantled. The population is no longer warned of acute dangers by sirens but instead via radio, television or Internet. The disadvantage of this procedure is that the corresponding devices must be turned on. There is absolutely no "wake-up effect."

With known systems and methods for warning the population, an attempt is made to warn a group of people within a spatially limited area. Various concepts are pursued here:

a) In a transmission via radio signals, the transmitter range of the signal is limited such that only the receivers within the transmission area are able to receive a signal. The transmission area must correspond to the warning area. Such an embodiment is described in DE 39 15 099 A1, for example. One disadvantage is that the location and power of the transmitter must be selected such that the transmission range matches the warning region. Since the warnings must be delivered with very short notice, ultimately there remains only the possibility of defining certain warning regions around previously defined locations of transmitters. It is impossible to adapt to a prevailing warning situation. The warning regions are therefore often very large, so the warning also goes to people not affected by the hazard. To increase the accuracy of the warning regions, many transmitters would have to be constructed, which would lead to an unacceptable financial expenditure.

b) Another possibility is to code the warning signal in accordance with a previously defined warning area that is to be warned. Such procedures are described, for example, in DE 299 14 155 U1, DE 20 2004 006 414 U1, DE 32 11 881 A1, EP 1 143 394 A, WO 2004/004305 A or U.S. Pat. No. 5,121,430 A. These approaches have the disadvantage that the coded areas (e.g., a federal state or an administrative district) must be defined in advance. These systems are thus very static and are difficult to expand. Based on the predefined areas, these systems are very inaccurate, because in most cases the areas warned are too large. Therefore, acceptance among individual users declines. The usability of such a system is therefore greatly restricted because one must consider in advance whether warning many people who will not be affected within an area might not lead to panic and in the long run result in disregard of the warnings.

c) Another approach in the prior art takes into account the wake-up effect and uses existing communication means, in particular the telephone, to warn the population. Such a system is described in DE 102 04 300 A1 or U.S. Pat. No. 6,816,878 B1. These methods are based on the central system being aware of the location of the receiver of the warning and determining at the beginning of the warning for which receivers the warning will be of interest. Though, the transmission of warning messages via telephone has numerous disadvantages that make the telephone unsuitable. On the one hand, the telephone lines may be damaged in the event of natural catastrophes such as storms or floods. On the other hand, warning a large number of subscribers would result in overloading of the telephone network. Additional difficulties occur due to the opening of the telecommunications market, resulting in a large number of providers offering telephone connections. A fast and coordinated selection of all connections within a certain area is almost impossible. The use of Internet telephone technology also makes it difficult to warn a population. When a warning is transmitted via mobile telephones, a breakdown of the telephone network would have to be expected in the event of a catastrophe, because these communication networks are based on point-to-point connections, not on parallel distribution. When a large number of connections are affected, this could lead to long waiting times, which would make this method unacceptable. Furthermore, the dependence on landlines, which are at risk due to water, earthquakes and storms, is also a factor for these networks.

An object of the present invention is therefore to propose a system and a method for warning the population by means of warning messages that will overcome the problems encountered in the prior art.

The object is achieved by a system for transmitting a warning message over a radio network using a transmitter and a receiver having the features of claim 1, by a receiver with the features of claim 8 and a method for receiving a warning message in a receiver having the features of claim 13 and a method for transmission having the features of claim 14.

The dependent related claims, define preferred further embodiments and characterizations of the system, the receiver and the methods.

The inventive system for transmitting a warning message via a radio network comprises at least one transmitter and at least one receiver. The at least one transmitter has an antenna for transmitting the warning message via the radio network. The warning message transmitted by the transmitter includes parameters of a warning area, which describe and/or define an individually and just now defined region (not predetermined and defined on the spur of the moment). The warning message may optionally comprise a warning reason and/or a warning behavior (recommended action). The receiver of the inventive system has an antenna for receiving the warning message transmitted via the radio network, a decoder for decoding the warning message, a processor for processing and a memory and a warning output unit. The location of the receiver is stored in the memory.

The differences from the approaches from the prior art listed above lie in particular in the fact that in contrast with approaches a) and b), the warning region is dynamically selectable and is not based on regions defined previously. In contrast with the approaches of the prior art listed under c), the evaluation of whether the respective warning receiver is within the region to be warned is not performed centrally but instead each individual warning receiver determines this on its own. In particular, the dynamic definition of the region to be warned and the evaluation in each individual receiver according to the invention were not known in the past and offer major advantages. Furthermore, with the invention described below, permanent central storage of the position of warning devices is not necessary, which is an advantage from the standpoint of privacy protection regulations in particular.

The inventive system has the advantage that it is very flexible because the warning area is defined as a function of the situation. It is not necessary to define warning regions in advance and store this data in the individual receivers. Therefore there is no need for any prior communication between the transmitter and the receivers. Furthermore, this system has the advantage that both small and large regions can be warned, depending on the event triggering the warning message.

The term "radio network" is understood to be a network by means of which digital information can be transmitted to all the receivers within the transmission range of the transmitter(s). These include, for example, pager networks or so-called broadcast networks, e.g., FM-Stations with RDS. All transmitters of the radio network can transmit the same information or the transmitters can transmit different information in different regions, wherein the information may also include warnings or warning messages and/or warning information.

The warning message received is captured and read out in the receiver by means of a capture algorithm. An analysis algorithm analyzes whether the location stored in the receiver is within the warning area. If this is the case, then a warning signal is generated and outputted by a warning output unit. The warning signal is of course outputted only if the warning message is error-free. In this regard, a checksum, which allows a check of the warning message for correctness, is optionally included in the warning message. The receiver consequently has a certain "machine intelligence."

The verification by the analysis algorithm of whether the location of the receiver is within the warning area is performed by a calculation on the basis of the transmitted parameters of the warning message. To this end, the warning area may, but need not necessarily, be determined completely in the receiver. In many cases, a statement can be made about whether the location is within the warning area based on these parameters. In the case of a circular warning area, it is possible to calculate whether the location of the receiver is within the warning zone, i.e., whether the warning message pertains to the receiver, by calculating the distance from the center and comparing this with the radius.

The receiver thus performs the main computation work to calculate the individual warning zone (generated just now or ad hoc) from a coded "description" and/or a parameterized instruction. The actual computation work to decide whether the receiver is within the warning area and also for analyzing the warning message and optionally for determining and calculating the warning zone is thus performed by the receiver(s). This is also one of the reasons why the transmitter does not need any information about the locations of the receivers.

In a preferred embodiment, the warning area is automatically calculated in the receiver from the parameters of the warning message by means of a zone algorithm. The receiver automatically determines the warning area from the transmitted parameters of the warning message. The required computing power is ensured by an appropriate processor in the receiver. The determination of the warning area and the verification of whether the location stored in the receiver is within the warning area are performed very quickly. There is no mentionable delay between reception of the warning message and output of a warning, if necessary.

The warning area is an individual warning zone, which is preferably described by its center and at least one dimension of the area. The center is described by geographic coordinates, which are defined in the form of degrees, minutes and seconds, for example. Such a description of the area is therefore also referred to as "geographic referencing." Not only the midpoint and/or the center of the warning area but also its shape can be defined by geographic coordinates as longitude and latitude. An unambiguous description is thus possible. The warning area may thus be placed in any location, regardless of the position of the broadcasting transmitter.

In the case of a circular warning area (as a special case of an ellipse) the radius is given in a unit of length, such as meters or kilometers. However, it may also be described in the form of a triple of degrees, minutes and seconds. If the warning area is a square area, an edge length is given. The center of the circle then corresponds to the point of intersection of the angle bisector, i.e., the center of the square. In the case of a rectangular warning area, another dimension must be given. This may then be provided as an optional second dimension in the warning message. It is thus possible to define very individual warning regions, e.g., including ellipses. It is also conceivable for the shape of a warning area to be described by a mathematical curve or by a plurality of curves or curve approximations (e.g., spline functions).

The warning area may be defined with a high precision up to date (ad hoc) and as a function of the situation. Various criteria may be used as the basis, e.g., the geographic characteristic of the region (urban area, city, rural area) or the hazard situation that has currently arisen. The reactions may vary, depending on the different situations. In the event of a fire, it may be advisable to warn individual streets. In the event of a flood, areas along the courses of rivers are preferably to be described as the warning area, or in the event of a major accident at a chemical factory or a power plant, relatively extensive circular areas could be defined, but when climate conditions such as wind are taken into account, it may also be conceivable for these areas to be in the shape of ellipses or the like. The inventive system allows for much flexibility here.

As soon as the warning area has been defined based on the hazardous situation occurring, the type of hazard or the geographic characteristic, as described above, the parameters describing the individual warning zone as accurately as possible are determined in the transmitter of the system for transmission of a warning message. The warning area is thus quasi-coded by the parameters. This has the advantage that even complex warning areas can be described on the basis of a few parameters. Since the receiver of the system has adequate computation power, it can "decode" the warning area from the parameters. Consequently, the warning area is calculated automatically in the receiver on the basis of the parameters. To do so, the receiver need not contain any additional information about the warning area. All the information is stored in the parameters. Only in this way is it possible to transmit any desired, previously undefined warning areas. It is possible in this way to respond to the prevailing situation very accurately.

Because the warning is distributed over an existing radio network, a rapid transmission of the warning is possible (into the warning regions and also into other regions). All receivers within the warning area may be addressed in parallel. Individual receivers installed in households may thus be warned in a very targeted and flexible manner without having to address each household individually. This is possible in an efficient manner because the concrete receiver location data need not be stored permanently in a central system and need not be coded or stored in the warning message.

If information other than warning messages not intended for the receiver and/or recipient of the warning of the network is transmitted via the radio network, then the warning information must be preceded by an identifier by means of which the receiver can recognize when a warning message is being transmitted.

In a preferred embodiment of the inventive system, not only individual warning zones defined on the basis of a situation may be transmitted in the warning message but also warning regions defined in advance may be transmitted. Such warning regions may be, for example, counties, administrative districts, postal code regions or the like, as they are known in the prior art. In this case the receiver has information about the warning regions stored in a memory.

If the system provides for both predefined warning regions and individual warning zones to be transmitted, the warning message must include the type of warning area (warning region or individual warning zone), so the receiver is able to decide on the basis of the type of warning area whether a code for the predefined warning region or parameters for an individual warning zone are contained in the warning message. Depending on this, either the code of the warning region transmitted is compared with a stored code for a warning region or a unique warning zone is determined currently on the basis of the parameters.

In a preferred embodiment, the transmitted warning message has a first part and a second part. The type of warning area is defined in the first part. In the second part, parameters of the warning area, the warning reason and the warning behavior are included. The type of warning area may be either a predefined warning region or an individual warning zone according to the principle of geographic referencing. The parameters of the warning area depend on the type of warning area. With certain embodiments, the type of warning area may also be defined in advance and need not be transmitted.

The receiver is designed so that by means of a capture algorithm, the first part of the warning message, if present, is read out and it is determined whether the warning area is a fixedly predetermined warning region or an individual warning zone. If the warning area is a warning region, then it is preferably stored in coded form, wherein two warning areas can especially preferably be transmitted with one warning message.

If an individual warning zone is indicated as the type of warning region, then the receiver determines by means of the zone algorithm the individual warning zone on the basis of the parameters in the second part of the warning message, i.e., on the basis of the center and the radius of an individual circular warning zone, for example.

Due to the optional two-part design of the warning message, which is distributed via the inventive system, it is possible to transmit valid previously defined warning regions as well as individual situation-dependent warning zones. Only one receiver is necessary. No changes need be made within the system.

When an event requiring a warning occurs, a crisis team decides in which warning area the existing receivers should be warned. Either a warning region that has been defined previously is selected or an individual warning zone whose center is usually the site of the event requiring the warning is defined. In a preferred embodiment, the transmitter includes a processor, in which parameters of the warning message are defined by means of an allocation algorithm. If the warning area is a warning region, the parameters include a code for the warning region.

Generation of the warning message, in particular the parameters, by an allocation algorithm is preferably performed in the transmitter itself. Alternatively it is possible to have this allocation algorithm run in a separate processing device and to transmit the generated warning message to a transmitter, which then transmits the warning message. A set of parameters describing the warning zone as best as possible is generated automatically from the individual warning zone just now defined. Then the warning area (individual warning zone) can be calculated accurately in the receiver on the basis of this parameter set. This is preferably performed by an algorithm.

It is not necessary to limit the transmitter range of the transmitter or of a transmitter network having a plurality of transmitters because the warning area is contained in the warning message and the warning area is analyzed in each receiver. Consequently, long-range transmitters or transmitter networks may be used.

The inventive receiver for receiving a warning message transmitted via a radio network has a decoder, a processor and a memory, in which the location of the receiver is stored. A received warning message may be outputted by a warning output unit. According to the present invention, the receiver comprises a capture algorithm for capturing the warning message, and for reading the parameters of the warning area out of the warning message. By means of a zone algorithm, which is preferably implemented in the processor of the receiver, the warning region is determined from the parameters of the warning message. An analysis algorithm then analyzes whether the location stored in the receiver lies within the warning region. If this is the case, a warning signal is outputted. In a preferred embodiment, a warning reason and/or warning behavior are outputted. Both of these may be contained in the warning message, preferably in coded form. In a preferred embodiment, warning reasons and warning behavior (recommendation) are stored in coded form in a memory in the receiver such that warning message must contain only the code. The corresponding warning reason with the code of the warning message is then displayed in the warning output unit.

The warning output unit preferably includes an acoustic output and an optical output. A wake-up function of the receiver is implemented in this manner. The warning reason and the warning behavior are preferably shown on a display or outputted by means of a voiceprompt. Both of these are outputted in plain text and can then be read or listened to directly. Alternatively, a simple version of a receiver is conceivable, in which the warning reason and the warning behavior (conduct) are outputted in coded form through the display of control lights. The user must then decode the reason and the behavior himself on the basis of a table.

According to the present invention, information is contained in the system, preferably in the transmitter, such that the valid fixed warning regions and the geographic coordinates of the address are known for each address, if present. This information must also be known to the receiver. The information is therefore implemented in the receiver in a configuration process. The receiver may be configured manually by the user by entering predetermined configuration data into the receiver. An input unit is optionally provided in the receiver for this purpose.

Alternatively, the receiver may especially preferably be configured automatically by means of a configuration algorithm in the processor. In this case, the receiver receives the required configuration data via the radio network, especially preferably in the form of a so-called configuration message, which may also contain the serial number of the receiver.

In an alternative embodiment, the current location of the receiver is determined constantly or on demand by integrated devices or devices connected optionally continuously or temporarily for position determination, e.g., GPS receivers and, when there is a change in geographic position, these are automatically stored in the configuration memory of the receiver. The position determined with the GPS receiver is thus used as the basis for the verification of whether the receiver is in the transmitted and calculated warning zone.

The invention is explained in greater detail hereafter on the basis of exemplary embodiments shown in the figures. The particulars shown there may be used either individually or in combination to create preferred embodiments of the invention. In the figures.

Figure 1:
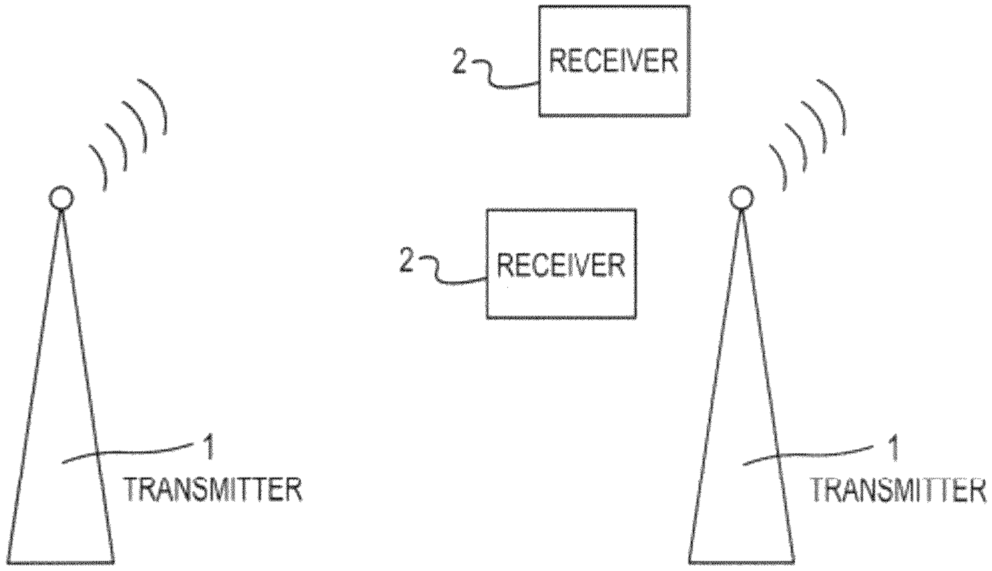
FIG. 1 shows a schematic diagram of the inventive system with a transmitter and a receiver.

The inventive system for transmitting a warning message comprises a radio network having at least one transmitter 1 and a plurality of receivers 2 (FIG. 1).

Figure 2:
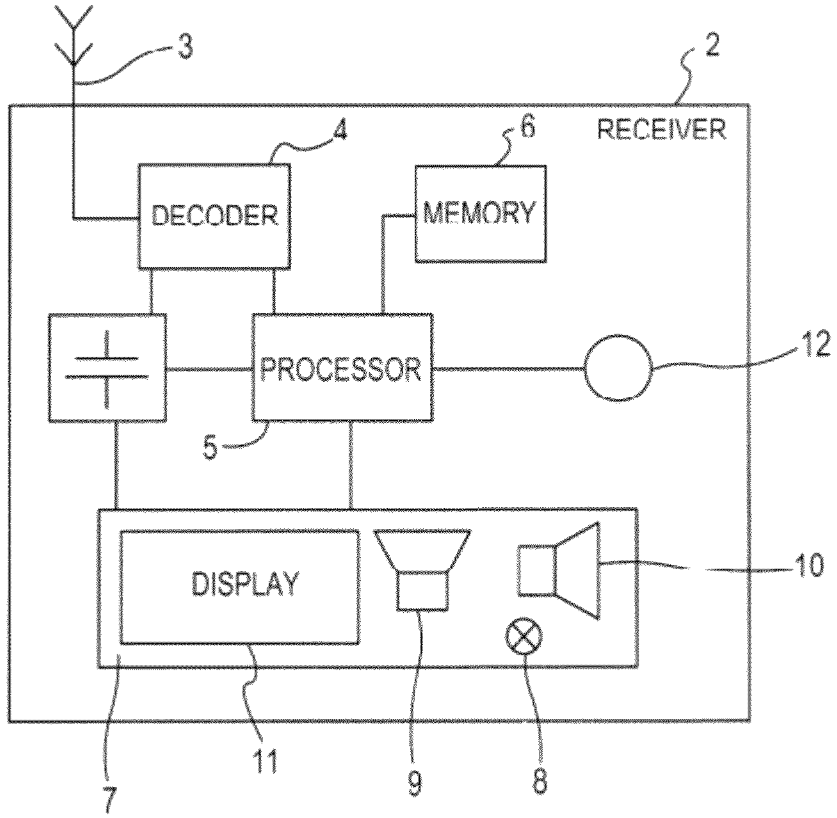
FIG. 2 shows a schematic diagram of the receiver from FIG. 1.

FIG. 2 shows the receiver 2 in detail. It includes an antenna 3, a decoder 4, a processor 5 and a memory 6. A warning output unit 7 has a warning light 8, a siren 9, a loudspeaker 10 and a display 11, on which a warning reason and the warning behavior may be outputted in plain text. The warning reason and warning behavior may also be outputted acoustically via the loudspeaker 10 by using a synthetic voice. The siren 9 serves to signal a warning and has a wake-up function to draw attention to a warning message that has been received. The warning output unit 7 may optionally also contain an interface to transmit a warning signal to another device.

The receiver 2 also comprises a pushbutton 12, which serves to perform a function test on the receiver 2 and also to put the receiver in a different mode, e.g., in a configuration mode or in a warning mode. Switching to a different mode may be confirmed by a signal tone via the loudspeaker 10.

The receiver in the as-delivered state is preferably already in the configuration mode. In this case, no valid configuration is stored in the memory 6 of the receiver 2. A configuration must be performed only when not only individual warning zones but also previously determined warning regions are to be transmitted to the inventive system or when such a function is at least to be optionally possible. Therefore, the receiver 2 must transmit its geographic position to the transmitter 1.

To perform the configuration easily, reliably and accurately and to take into account the privacy protection needs of citizens, the configuration is preferably performed anonymously. The user logs on to a server via the Internet and enters the serial number of the receiver 2 and the exact address of the installation site. From this information, the server determines the exact geographic coordinates of the system as well as the coding of the warning regions of relevance for the installation site.

Figure 3:
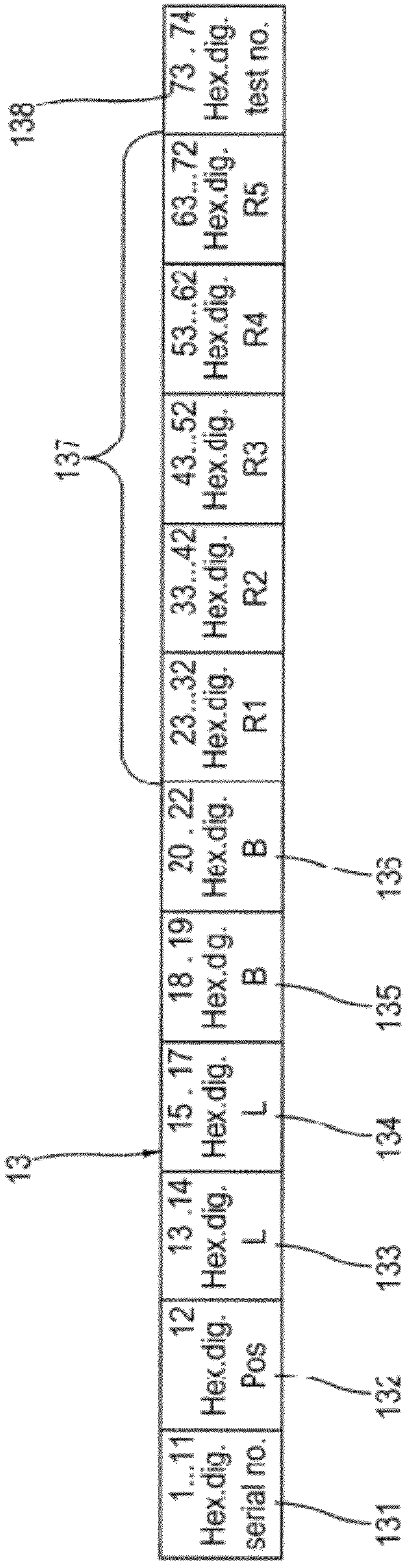
FIG. 3 shows the basic diagram of a configuration message.

The user is then instructed to switch the receiver 2 to the configuration mode by depressing the button 12 repeatedly. The server, which is connected to the transmitter 1, then transmits a configuration message over the radio network via the transmitter 1. FIG. 3 shows an example of such a configuration message 13.

The configuration message comprises the serial number of the receiver 2 which is to be configured as well as optionally all configuration data such as, for example, the geographic coordinates of the installation site and/or defined warning regions. The configuration message is preferably sent from a transmitter 1 only in the transmission region in which the installation site is located. However, the transmission of the configuration message may also be performed in a centralized manner. If exclusively individually defined warning zones are determined on the basis of parameters with this system, configuration of the receiver 2 is not necessary. However, if a calculation is to be performed for the reception of warning messages, then the configuration message may be used to query the corresponding data from the user in advance.

As an alternative to manual input of the serial number into a server over the Internet, this operation may also be performed by telephone through a call center agent after the user has called a number assigned to him. The configuration service here is preferably charged to the user. This may be done by calling a toll number or by sending a premium SMS at a charge, for which the user must enter a special PIN number, which identifies the user unambiguously. In this case, the server is to be connected to suitable accounting systems.

As soon as the receiver 2 is in the configuration mode and the transmitter 1 is transmitting a configuration message 13, the decoder 4 checks the received data stream for a valid configuration message 13. The configuration messages are preferably transmitted to a certain radio address (RIC). In the configuration mode, the decoder 4 analyzes only messages sent to this address. As soon as a configuration message 13 is recognized by the receiver 2, the transmitted serial number is compared with the serial number of the receiver 2. The configuration message 13 is processed further only if the serial numbers match.

The configuration message 13 preferably comprises 74 hexadecimal digits or alternatively BCD numbers or similar codes. For this purpose, the configuration message is subdivided into different parts. The serial number 131 of the device is coded in the first 11 hexadecimal digits. The $12^{th}$ hexadecimal digit 132 codes the position of the geographic coordinates. The position is differentiated therein in the macro range, namely according to north or south hemispheres and/or whether the installation site is east or west of the zero meridian. The hexadecimal digit is 4 bits long. The highest bit codes whether the location is in the northern or southern hemisphere (northern hemisphere=0, southern hemisphere=1). The lowest bit characterizes the location with respect to the zero meridian (east=0, west=1).

The next two hexadecimal digits 133 describe the longitude (0° to 180°) which is coded in 8-bit hexadecimal code. The additional part 134 comprising three hexadecimal digits (corresponding to 12 bits) contains the minutes and seconds of longitude, coded as arc seconds in the range from 0 to 3599, likewise in hexadecimal code.

The configuration message 13 contains the information on latitude in the next two segments 135, 136, again coded in hexadecimal code according to longitude. Five warning zones are coded in the next segment 137. Each of the warning zones comprises 10 hexadecimal digits, corresponding to 40 bits. If less than five warning zones are to be transmitted in the configuration message, then the unused warning zones are to be filled with a placeholder code (0xFFFFFFFFFF). The last partial segment of the configuration message 13 comprises a checksum 138 comprising two hexadecimal digits and being thus 8 bits long. The checksum 138 is preferably transmitted according to the CRC-8 method over all configuration data.

The decoder 4 tests the checksums 138 and writes the received geographic coordinates to memory 6 if the checksum 138 is correct and if the serial number stored in the device matches the transmitted serial number 131. The received warning regions are preferably also stored in the memory 6. The memory 6 is designed as a nonvolatile memory, so it will not be erased in a power failure. After storing the installation site as geographic coordinates and storing the warning regions, the receiver 2 automatically switches from the configuration mode to the warning mode. At the same time, the user can be informed of this change by an acoustic or visual display via the loudspeaker 10 and/or the warning light 8.

If valid configuration data have already been stored in the memory 6 of the receiver 2 before the configuration mode is switched on and if no valid configuration message 13 can be received within a predefined period of time, the receiver 2 automatically switches back to the warning mode.

In the warning mode, the decoder 4 checks the received data stream for a valid warning message, which is transmitted to a certain radio address (RIC). All other modules may be deactivated for power-saving reasons, so the receiver is activated only when a warning message 14 is recognized. Alternatively, so-called warning information may also be broadcasted by the transmitter 1, signaling only that a warning message is being sent, and serving such that the decoder 4 recognizes that those components of the receiver 2, e.g., the processor, which perform processing of a warning message, are to be activated, to receive the warning message 14.

If both fixed warning regions and individual warning zones are transmitted with the system, a decision must be made about which type of warning area is involved. Therefore, the type of warning area is preferably included in the warning message. The type of warning area is analyzed by the capture algorithm of the receiver 2.

Figure 4:
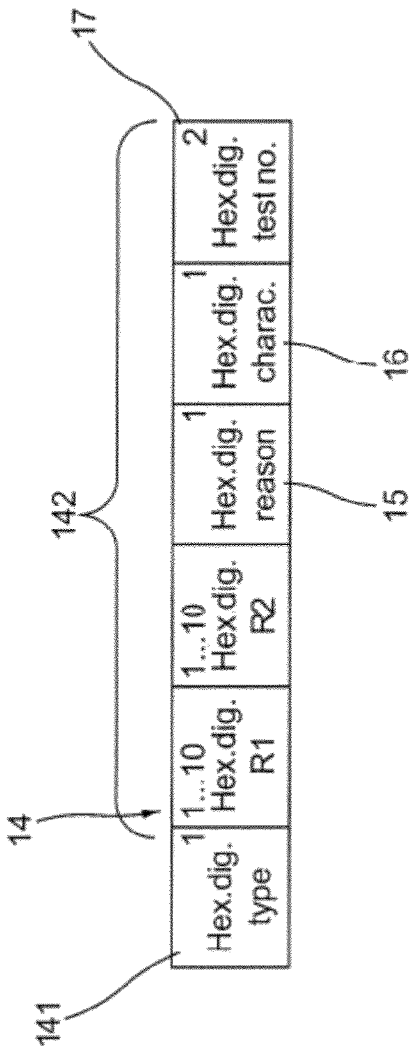
FIG. 4, 5 show the design of a two-part warning message.
Figure 5:
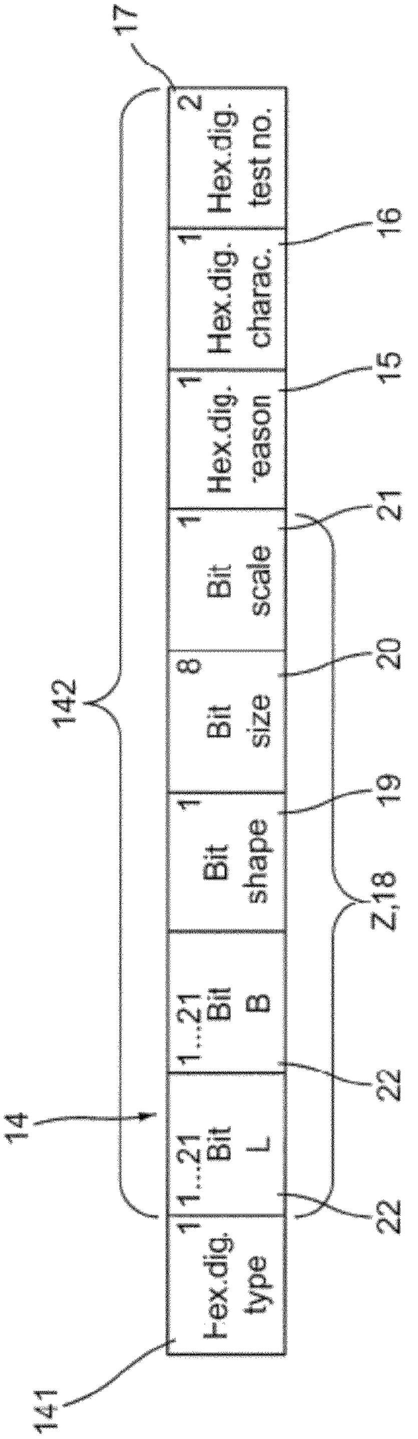

The warning message 14 therefore preferably comprises a first part 141 and a second part 142. The first part 141 preferably includes the type of warning area. The second part 142 is constructed as a function of the type of warning area. The type of warning area may be either the previously defined warning region or a dynamically defined warning zone, which may have different shapes and sizes, depending on the situation. The type of the warning area is preferably a 4-bit number. For example, 0 represents for the transmission of a defined warning region and a 1 represents for an individual warning zone. The second part 142 of the warning message 14 is differentiated depending on the type of the warning area. FIG. 4 shows a warning message 14 with two warning regions. FIG. 5 shows a warning message 14 with an individual warning zone.

In the case of a warning message 14 with two warning regions (FIG. 4), the second part 142 comprises two warning regions R1, R2, a warning reason 15 and warning behavior 16, wherein the warning reason 15 and the warning behavior 16 each being represented by a hexadecimal digit. A total of 16 warning reasons 15 and 16 warning characteristics 16 can thus be coded. The second part 142 comprises a total of 24 hexadecimal digits.

A checksum 17 forms the last section of the second part 142 of the warning message 14. The checksum 17 is preferably determined over all warning data according to the CRC-8 method. It is a total of 8 bits long.

If only one warning region R1 is warned, then the second warning region R2 is filled with a placeholder (for example, "filling code" 0xFFFFFFFFFF). If one or more of the low-order hexadecimal digits of a warning region R1, R2 has a value 0, then all zones whose hexadecimal digit code has the same higher-order hexadecimal digits may be warned.

FIG. 5 shows a warning message 14 with an individual warning zone Z. The second part 142 of the warning message 14 comprises as warning parameters 18 the midpoint and/or center of the warning zone Z in the form of geographic coordinates, which are described as longitude and latitude. In addition, the second part 142 includes the shape 19 of the warning zone, a first dimension 20, optionally a second dimension when the shape 19 is a rectangular or elliptical shape, and again optionally, as shown in FIG. 5, a scale 21 for the size of the warning zone Z. Additional components of the warning message 14 include the warning reason 15 and the warning behavior 16, each as a hexadecimal digit, as well as a checksum 17, comprising two hexadecimal digits.

Figure 6:
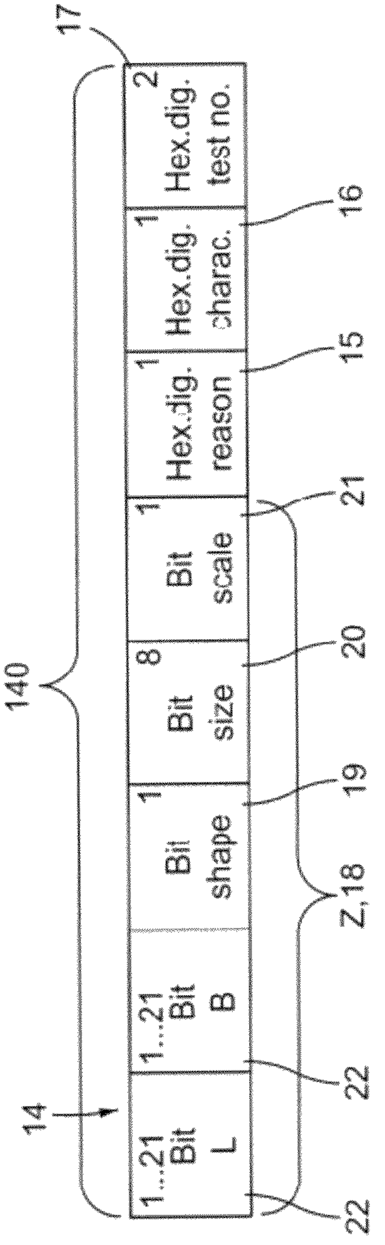
FIG. 6, 7 show the design of a one-part warning message.
Figure 7:
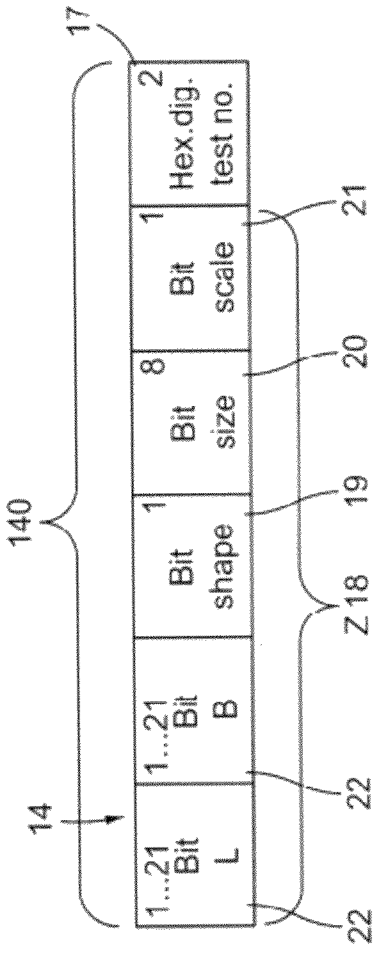

FIGS. 5, 6 and 7 show a warning message in which an individual warning zone Z is transmitted. FIG. 5 shows a two-part warning message having a first part 141 and a second part 142. FIGS. 6 and 7 each show a one-part warning message 140, wherein the one part 140 from FIG. 6 corresponds to the second part 142 from FIG. 7. The part 140 from FIG. 7 shows a warning message 14, comprising only the parameters 18 and a checksum 17, but not including a warning reason or warning behavior (conduct).

With reference to FIGS. 5 to 7, the warning message part 140, 142 is described in detail as follows:

The warning center 22, which is imaged in geographic coordinates, is coded with a 21-bit-long sequence for the longitude and another 21-bit-long sequence for the latitude in the warning message 14. The first 8 bits of the longitude and latitude each represent the number of degrees, while the next 12 bits represent the number of seconds. The last bit represents the position of the longitude (0=east, 1=west) with respect to the zero meridian and/or the position of the latitude (0=north, 1=south). The shape 19 of the warning zone Z is transmitted in one bit in this embodiment, where the bit is set at 0 if the shape is square. The bit has a value of 1 for a circular warning zone Z. If rectangular or elliptical warning areas are also to be warned, the shape 19 must be represented by 2 bits.

The size of the warning zone Z is coded via the first dimension 20 (8 bits) and the scale 21 (1 bit). If the bit of the scale 21 has a value of 0, then the size (the radius for a circular shape, half an edge length for a square shape) of the warning zone may be between 1 and 256 arc seconds. In this case, the value of the first dimension 20 corresponds to the radius and/or half the edge length in arc seconds plus one arc second.

If the bit of the scale 21 has a value of 1, then the product of the first dimension 20 and 20 arc seconds corresponds to the radius and/or half the edge length in arc seconds plus 260 arc seconds (size=(dimension*20 arc sec)+260 arc sec). The radius and/or half the edge length is thus between 260 arc seconds (dimension 20=0) and 5380 arc seconds (dimension 20=255).

The dimension 20 of the warning area consequently corresponds to the diameter of a circular warning area and/or the edge length of a rectangular warning area.

In Europe one arc second corresponds approximately to a geographic latitude of 31 meters and a geographic longitude of 20 meters. As a result, the areas actually described do not have a circular or square shape but instead form an ellipse or a rectangle. This "error" may be compensated by basing the statement of the diameter and/or edge length of the warning zone Z on a distribution only in geographic longitude or only in geographic latitude. During configuration, information about the "error" must also be supplied to the receiver 2. This correction factor relates to the ratio of a path length of one arc second in the longitudinal direction to one arc second in the lateral direction at the location of the device.

According to the invention, this method for transmitting a warning message in a paging network from a transmitter to a receiver comprises the following steps: In the first step, a warning message 14 is generated by a compilation algorithm, wherein the warning message comprises at least the parameters 18 of the individual warning zone and optionally contains a checksum 17. The analysis algorithm of the receiver 2 verifies whether the stored location of the receiver 2 is in the warning zone Z.

If previously defined warning regions R1, R2 as well as an individual warning zone Z can be transmitted with this method, then by means of the compilation algorithm of the transmitter 1, a warning message comprising a first part 141 and a second part 142 is generated, with the type of warning area being stored in the first part 141. In the second part 142 of the warning message 14, parameters 18 are defined, including the warning area, the warning reason 15, the warning behavior 16 and optionally a checksum 17. The warning message generated is transmitted by the transmitter 1 and received by a receiver 2 in the paging network. The first part 141 of the warning message 14 is automatically read out by means of a capture algorithm in the receiver 2. On the basis of the first part 141 of the warning message, it is specified whether the warning area is a predefined warning region R1, R2 or an individual warning zone Z. On the basis of the parameters 18 in the second part 142 of the warning message 14, representing either the warning region R1, R2 or the individual warning zone Z, an analysis algorithm verifies after readout whether the location of the receiver 2 stored in the memory 6 of the receiver 2 is within the warning area. If this is the case, then a warning signal is outputted by a warning output unit 7.

In the method for receiving a warning message in a receiver, the warning message is preferably read out after automatic reception of the warning message 14 by means of a capture algorithm and a checksum is determined over all the affected data bits of the warning message 14 and compared with the checksum 17 transmitted with the warning message 14. If the checksums do not match, the warning message 14 is discarded. Since the transmitter 1 transmits the warning communication repeatedly within a predefined interval of time, e.g., 10 times in sequence, the receiver 2 accepts the message as a valid warning only after repeated reception, e.g., three times, with the correct checksum 17 and the same warning content. As a result of this measure, the false alarm rate can be reduced dramatically.

In verifying the position of the receiver 2 with respect to the warning area by means of the analysis algorithm, if a warning region R1, R2 is transmitted in the warning message 14, a determination is performed of whether the warning region or a "higher-order warning region" (characterized by several zeros at the end of the hexadecimal code of the warning region) corresponds to the warning region R1, R2 stored in the receiver 2. If no match is found, the warning message 14 is discarded.

In the case of a warning message 14 with a warning zone Z, the receiver 2 verifies by means of the analysis algorithm whether the stored location of the receiver 2 is in the warning zone Z.

In the case of a square warning zone Z, there is a verification of whether the transmitted longitude of the warning center 22 deviates by less than half the edge length (formed from dimension 20 and scale 21), optionally after conversion using a correction factor. The same verification is then performed for the latitude. If the deviation is within the predetermined limits, the warning message 14 is a valid message.

In the case of a circular warning zone, the difference between the location of the receiver 2 and the center 22 is calculated. To do so, the geometric mean of the deviation in the longitudinal direction and the deviation in the lateral direction (each in arc seconds) is determined. The stored correction factor is taken into account in advance, if necessary. If the distance is less than half of the radius transmitted with the warning message 14 (formed from the first dimension 20 and the scale 21) of the warning zone Z, then it is a valid warning message 14.

In the case of a valid warning message, a warning sound, which may be in the form of an SOS signal, for example, is emitted by the siren 9 of the receiver 2. However, the siren sound is turned off after a certain period of time or it may sound at intervals until the pushbutton 12 on the receiver 2 is pressed. At the same time, the warning light 8 is triggered or alternatively a signal light may be triggered. In addition, of the warning reason 15 and the warning behavior 16 are preferably outputted as a voice message with voice messages recorded previously via the loudspeaker 10 or they appear as plain text on the display 11 of the receiver 2.

The invention claimed is:

1. System for transmitting a warning message via a radio network having at least one transmitter and at least one receiver, wherein the transmitter comprises:

an antenna for transmitting the warning message over the radio network, wherein the warning message includes a first part that includes the type of a warning area and a second part that includes parameters of the warning area, and the receiver comprises:

an antenna for receiving the warning message, a decoder, a processor, a memory in which the location of the receiver is stored, and a warning output unit, wherein the received warning message is captured in the processor by means of a capture algorithm and is read out, and an analysis algorithm automatically calculates whether the location stored in the receiver is within the individual warning area, and if this is the case, a warning signal is generated and output by the warning output unit.

2. System according to claim 1, characterized in that the warning area is calculated from the parameters by means of a zone algorithm.

3. System according to claim 1, wherein the warning area is an individual warning zone and the parameters comprise the geographic coordinates of a center of the individual warning zone, a code for the shape of the individual warning zone, a dimension, and/or a scale.

4. System according to claim 1, characterized in that the warning message transmitted includes a warning reason and/or warning behavior.

5. System according to claim 3, characterized in that the dimension of the individual warning zone is the diameter of a circular warning region or the edge length of a square warning region, the dimension preferably being weighted with the scale.

6. System according to claim 1, characterized in that the parameters comprise a second dimension when the shape of the warning zone is an ellipse or a rectangle, the dimensions corresponding to the axes of the elliptical warning area or to the edge of the rectangle.

7. System according to claim 1, characterized in that the transmitter comprises a processor in which the parameters of the warning message are defined by an allocation algorithm, such that the parameters of an individual warning zone are generated by a) defining a center of the warning zone, b) defining the shape of the warning zone as an elliptical shape or a rectangular shape, c) defining a dimension of the warning zone and d) defining a second dimension of the warning zone.

8. Receiver for receiving a warning message, which is transmitted via a radio network, in particular as a component of a system according to claim 1, having a decoder, a processor and a memory, in which the location of the receiver is stored, and having a warning output unit, characterized in that the warning message is captured by means of a capture algorithm, and parameters of an individual warning zone are readout of the warning message, the individual warning zone is optionally determined from the parameters by means of a zone algorithm, an analysis algorithm verifies whether the location stored in the receiver is within the individual warning zone and if this is the case, a warning signal is generated and the warning signal is outputted by means of the warning output unit.

9. System according to claim 1, characterized in that the receiver is individually configurable for its location, and the configuration is performed manually by the user on the basis of predetermined configuration data or automatically by means of a configuration algorithm in the processor, the configuration data being received via the radio network.

10. System according to claim 1, characterized in that the receiver comprises a memory in which warning reasons in coded form and warning behavior in coded form are stored.

11. System according to claim 3, characterized in that the receiver comprises an analysis unit, in which it is recognized by means of an analysis algorithm whether the location stored in geographic coordinates in the memory of the receiver is within the transmitted individual warning zone, the warning zone is described by the parameters, the geographic coordinates of the center, the transmitted dimensions taking into account the scale, and the shape of the warning zone.

12. System according to claim 11, characterized in that by means of an analysis algorithm, the difference between the stored location and the transmitted center of the individual warning zone is calculated, verifying whether the difference is less than half of the dimension of the warning area transmitted with the warning message, taking into account the scale, and if this is the case, determining, whether the location of the receiver is within the warning zone.

13. Method for receiving a warning message in a receiver of a radio network, the radio network having a transmitter and a receiver, the receiver including a processor, a decoder, a warning output unit and a memory in which the location of the receiver is stored, comprising:

receiving a warning message including parameters of a warning area;

determining the warning area from the parameters; and analyzing, using said processor, whether the location of the receiver stored in the memory is in the warning area and if this is the case, outputting a signal using said warning output unit, wherein said warning message includes a first part and a second part and the type of the warning area is indicated in said first part.

14. Method according to claim 13, wherein determining the warning area form the parameters further comprises:

determining whether the warning area is a defined warning region or an individual warning zone, and if the warning area is a warning region, determining the warning region from the second part of the warning message, and if the warning area is an individual warning zone, determining the warning zone from the parameters.

15. Method for transmitting a warning message in a radio network having a transmitter and a receiver, characterized by the following steps:

generating a warning message by means of a generation algorithm, the warning message comprising a first part that includes the type of a warning area and a second part that includes parameters of the warning area, transmitting the warning message from the transmitter over an existing radio network to the receiver.

16. Method according to claim 15, wherein the warning area type is a warning region.

17. Method according to claim 16, wherein the second part comprises two warning regions.

18. Method according to claim 13, comprising:

determining a checksum of the warning message; and comparing the checksum to a checksum transmitted with the warning message.

19. System according to claim 1, wherein the receiver is configured to determine a checksum of the warning message;

compare the checksum to a checksum transmitted with the warning message; and discard the warning message if the checksum of the warning message and the checksum transmitted with the warning message do not match.

20. System according to claim 1, wherein the receiver is configurable for association with an installation address.

21. System according to claim 1, wherein the receiver is configurable for association with geographic coordinates and a warning region.

* * * * *